(12) United States Patent
Miyaoka

(10) Patent No.: US 7,622,685 B2
(45) Date of Patent: Nov. 24, 2009

(54) PORTABLE INFORMATION TERMINAL

(75) Inventor: Hidekazu Miyaoka, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 12/184,610

(22) Filed: Aug. 1, 2008

(65) Prior Publication Data

US 2009/0057007 A1  Mar. 5, 2009

(30) Foreign Application Priority Data

Aug. 30, 2007  (JP) .............................. 2007-224786

(51) Int. Cl.
*H05K 7/14* (2006.01)
*H04M 1/00* (2006.01)

(52) U.S. Cl. .................... 174/542; 174/535; 455/575.4; 361/756

(58) Field of Classification Search ................ 174/542, 174/520, 535; 379/440; 455/575.4; 361/741, 361/756

See application file for complete search history.

(56) References Cited

U.S. PATENT DOCUMENTS

| 7,343,182 | B2* | 3/2008 | Wu | 455/575.4 |
| 7,386,331 | B2* | 6/2008 | Hyun et al. | 455/575.4 |
| 7,395,102 | B2* | 7/2008 | Park et al. | 455/575.4 |
| 7,400,916 | B2* | 7/2008 | Lee et al. | 455/575.4 |
| 7,403,612 | B2* | 7/2008 | Nishihara | 379/433.12 |
| 7,409,236 | B1* | 8/2008 | Luna et al. | 455/575.1 |
| 7,447,528 | B2* | 11/2008 | Puranen | 455/575.1 |
| 7,450,173 | B2* | 11/2008 | Im et al. | 348/373 |
| 7,450,979 | B2* | 11/2008 | Seo | 455/575.4 |
| 7,452,223 | B2* | 11/2008 | Ha et al. | 439/161 |
| 7,463,911 | B2* | 12/2008 | Tseng et al. | 455/575.1 |
| 2004/0160511 | A1 | 8/2004 | Boesen | |

FOREIGN PATENT DOCUMENTS

| EP | 1 720 326 A1 | 11/2006 |
| JP | 2006-5564 | 1/2006 |
| JP | 2006-93999 | 4/2006 |
| WO | WO 02/063789 A1 | 8/2002 |

OTHER PUBLICATIONS

U.S. Appl. No. 12/185,325, filed Aug. 4, 2008, Miyaoka.

* cited by examiner

*Primary Examiner*—Hung V Ngo
(74) *Attorney, Agent, or Firm*—Oblon, Spivak, McClelland, Maier & Neustadt, L.L.P.

(57) ABSTRACT

A portable information terminal has a first casing, a second casing, a sliding mechanism to maintain a portable state wherein the first casing and second casing are overlapped, and a turning mechanism to modify the from the portable state, via a sliding state wherein the first casing and second casing mutually slide, into a usable state. The sliding mechanism engages with sliding grooves provided on each of the first casing and second casing, and provides axially supported sliding members. The turning mechanism has a member to limit the turning angle of the sliding members, whereby a state can be maintained when usable of the first casing and second casing forming a single face. Thus, a sliding-type portable information terminal is provided with an expanded operating face and output face by doing away with any overlapped portion.

5 Claims, 13 Drawing Sheets

FIG. 13A
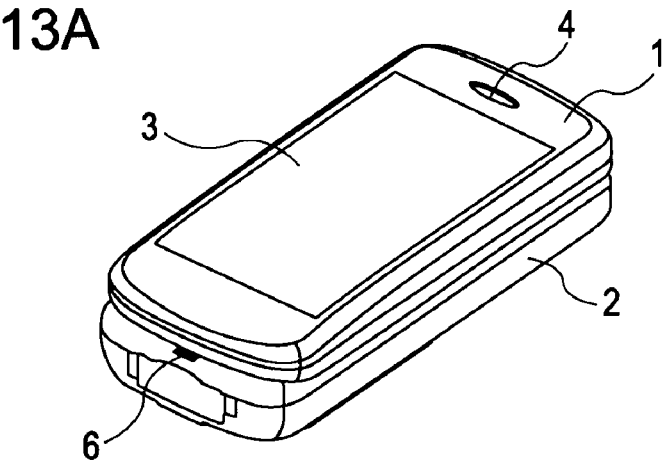
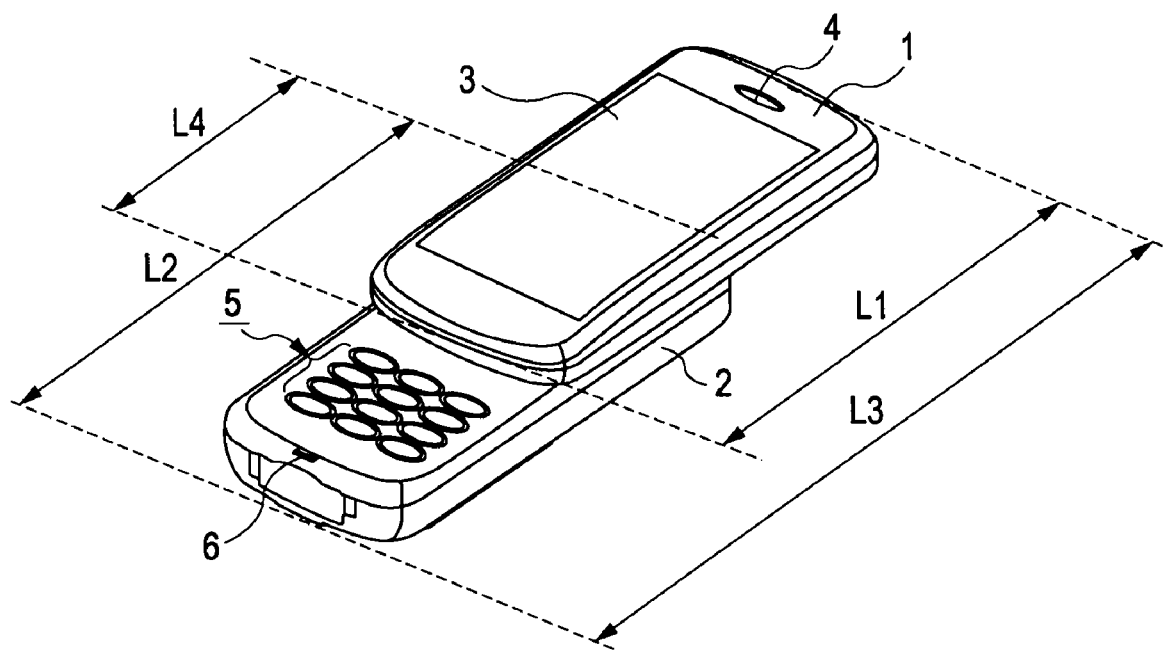
FIG. 13B

PORTABLE INFORMATION TERMINAL

CROSS REFERENCES TO RELATED APPLICATIONS

The present invention contains subject matter related to Japanese Patent Application JP 2007-224786 filed in the Japanese Patent Office on Aug. 30, 2007, the entire contents of which are incorporated herein by reference.

BACKGROUND OF THE INVENTION

1. Field of the Invention

The present invention relates to a portable telephone terminal, and specifically relates to a portable information terminal such as a portable telephone terminal, portable gaming device, or palm-size personal computer which can be altered between a portable state and usable state.

2. Description of the Related Art

Portable information terminals which are represented by a portable telephone terminal or the like are being developed in various forms so as to be more compact in a portable state than in a usable state. Representative forms thereof include a so-called "shell-form" (flip-phone) which employs a configuration which opens and closes similar to that of a clam-shell, and a "sliding form" wherein an upper casing slides as to a lower casing.

The technology described in Japanese Unexamined Patent Application Publication No. 2006-93999 is exemplified in FIG. 13 as an example of a sliding-type portable telephone, i.e. a sliding-type portable telephone which is formed with an upper casing 1 having a display unit 3 and receiver 4, and a lower casing 2 having an operating unit 5 and transmitter 6, so as to be slidable.

As shown in FIG. 13A, in the state of the upper casing 1 and lower casing 2 being closed, the display unit 3 and receiver 4 of the upper casing 1 are exposed, whereby the operating unit 5 and transmitter 6 of the lower casing 2 are covered by the upper casing 1. Also, as shown in FIG. 13B, in the state that the upper casing 1 and lower casing 2 are opened, the state thereof is such that each of the display unit 3 and receiver 4 of the upper casing 1 and the operating unit 5 and transmitter 6 of the lower casing 2 are exposed.

As shown in FIG. 13B, the dimensions in the sliding direction are L1 for the upper casing 1 and L2 for the lower casing 2, the dimensions in the state of the upper casing 1 and lower casing 2 being opened is L3, which is a dimension whereby a dimension L4 of the overlapped portion is subtracted from the sum total of L1 and L2.

SUMMARY OF THE INVENTION

As described above, the smaller the dimension of L4 is the better. This is because the size of the area of the operating unit 5 can be increased without increasing the portable state size.

Also, it is desirable for the display unit 3 and operating unit 5 to form a single face. With the technology described in Japanese Unexamined Patent Application Publication No. 2006-93999, efforts are made to reduce the difference in thickness, such as chamfering the edge portion of the operating unit 5 side on the upper casing 1. However, this does not solve basic problems such as the problem wherein the keys in positions close to the upper casing 1 on the operating unit 5 are difficult to operate.

There has been found the need to provide a portable information terminal, wherein substantial expansion of the operating face or display face of the portable information terminal can be realized with a sliding-type portable information terminal.

According to an embodiment of the present invention, a sliding-type portable information terminal includes: a flat first casing; a flat second casing which is overlapped on the first casing; a sliding mechanism to maintain a portable state of the first casing and the second casing overlapped together; and a turning mechanism to change from the portable state to a usable state via a sliding state whereby the first casing and the second casing mutually slide.

The sliding mechanism is formed with a first sliding mechanism having a sliding groove formed in the sliding direction in the first casing; a first sliding supporting member formed to slide within the sliding groove without disengaging from the sliding groove; and a sliding shaft member to axially support an inverse sliding groove side on the first sliding supporting member with the second casing; and a second sliding mechanism having a backside sliding groove formed in the sliding direction on the second casing; a second sliding supporting member formed to slide within the backside sliding groove without disengaging from the backside sliding groove.

The turning mechanism has a first turning control shaft member to axially support the second casing side on the first sliding supporting member with the first casing and a second turning control shaft member to axially support the first casing side on the second sliding supporting member with the second casing.

The first turning control shaft member and the second turning control shaft member have a turning angle control mechanism wherein turning is stopped at a angle formed by the face on the opposite side of the face of the second casing side of the first casing and the first casing side of the second casing forming a single face when the portable information terminal is in a usable state.

A portable information terminal can be provided which, when in the portable state, the lower casing (first casing) and upper casing (second casing) are overlapped together in a practical manner, and substantial expansion of the operation face and display face when in the usable state can be achieved.

The turning of the turning control shaft member may be stoppable while in the portable state and sliding state, while in the state of the vertical cross-section lengthwise direction of the first casing and the first sliding supporting member are at a predetermined angle; and the turning of the turning control shaft member may be stoppable while in the portable state and sliding state, while in the state of the vertical cross-section lengthwise direction of the second casing and the first sliding supporting member are at a predetermined angle.

A decorative groove is provided in the same shape as the sliding groove of the first casing in a linearly symmetrical position as the sliding groove. Thus, a linearly symmetrical design can be made on the face of the second casing side of the first casing.

A portable information terminal may be provided wherein the flat shape of the first casing and second casing are roughly the same shape.

A space for a cable which is an inner space reaching the first casing and second casing may be provided in the turning control shaft member and slide shaft member, with one or both of the first sliding supporting member and second sliding supporting member; wherein such space for cable is formed such that a cable or the like to connect a board built into the first casing and a board built into the second casing can be provided therewithin.

For a cable and so forth in this case, if a cable smaller than a serial cable such as an optical cable can be employed, the cable spacing, as well as the turning control shaft member and sliding shaft member can be minimized, whereby the portable information terminal can be provided in a smaller, thinner form.

The portable information terminal according to the present invention employs a sliding-type mechanism which does not have a portion that overlaps the upper casing (second casing) and lower casing (first casing) when in a usable state, so the operating face and display face can be substantially expanded, providing the advantages of being easy to use when in a usable state and compact when in a portable state.

BRIEF DESCRIPTION OF THE DRAWINGS

FIGS. 13A and 13B are perspective views of related art.

DESCRIPTION OF THE PREFERRED EMBODIMENTS

Figure 1A:
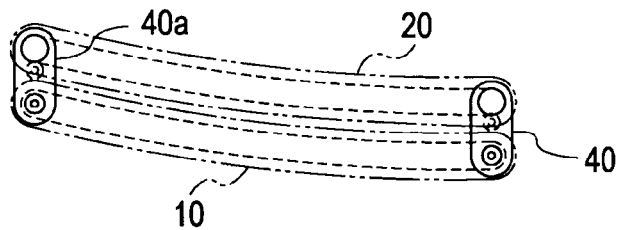
FIGS. 1A through 1G are cross-sectional diagrams illustrating the motion of a portable information terminal according to a first embodiment of the present invention.
Figure 1B:
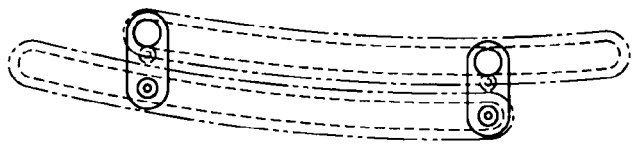
Figure 1C:
Figure 1D:
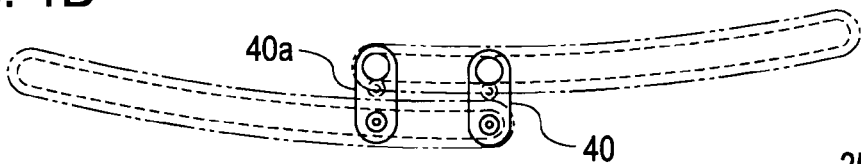
Figure 1E:
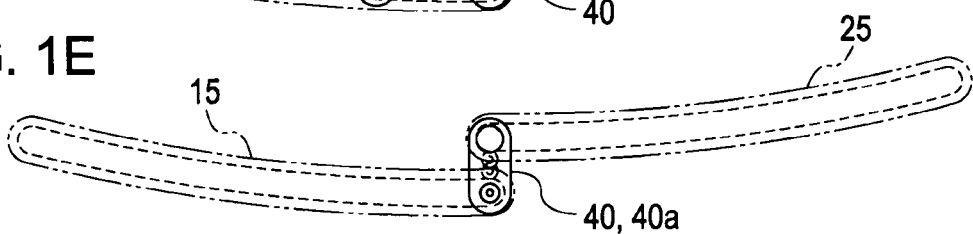
Figure 1F:
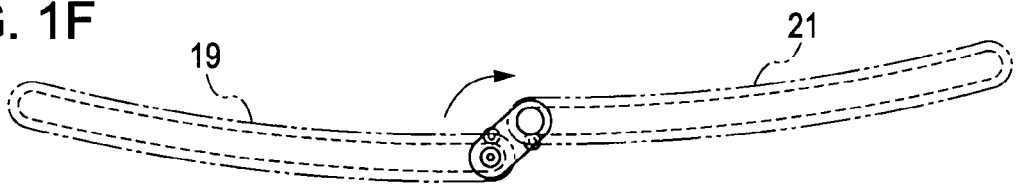

A portable telephone terminal will be described as an example of the portable information terminal relating to the present invention, with reference to the appended diagrams. With the present embodiment, a portable telephone terminal is exemplified, but it goes without saying that the content described here is only an example, and the present invention is not limited to a portable telephone terminal. For example, the present invention may also be applied to a portable personal computer, portable gaming device, PDA (personal data assistant), digital camera, digital video camera, and the like.

[Schematic Configuration of Portable Telephone Terminal]

FIGS. 1A through 1G illustrate the changes in form of the sliding-type portable telephone terminal from the portable state to the usable state.

As shown here, the portable telephone terminal according to the present embodiment has a first casing 10 having an operating face 15 whereupon operating buttons and so forth are primarily mounted, and a second casing 20 whereupon an output screen 25 made from a liquid crystal display device and so forth is provided. For a user of the portable telephone terminal according to the present embodiment, the first casing 10 is positioned on the lower side and the second casing 20 is positioned on the upper side.

Note that both the first casing 10 and the second casing 20 have a gentle curve so as to protrude downward in the direction of the paper face. This is convenient during the usable state of the portable telephone because when the speaker is positioned at the ear, the microphone is in close proximity to the mouth. With a so-called shell-type portable telephone, in the case of the portable state of being folded up, a space was created in the central portion so this was not desirable.

The portable information terminal according to the present embodiment is a sliding-type portable information terminal comprising a first casing 10, a second casing 20, a sliding mechanism to maintain a portable state of the first casing 10 and the second casing 20; and a turning mechanism to change from the portable state to a usable state via a sliding state whereby the first casing 10 and the second casing 20 mutually slide. The sliding mechanism engages with sliding grooves 19 and 21 provided on the first casing 10 and second casing 20 respectively, and has sliding members 40 and 40a which are axially supported. The turning mechanism has members to restrict the turning angle with the sliding members 40 and 40a, whereby the first casing 10 and second casing 20 can hold a state of a single face when in a usable state. This will be described in greater detail below.

A sliding supporting member 30 and a casing turning supporting member 40 are provided which can realize a portable state wherein the first casing 10 and second casing 20 are overlapped together in the state that the operating face 15 cannot be seen and the output face 25 is exposed, a sliding state wherein the first casing 10 and second casing 20 are mutually sliding, a usable state wherein turning is performed so that there are no mutually overlapped portions and the first casing 10 and second case 20 form a single face. The sliding supporting member 30 is positioned on both sides of the first casing 10, and the casing turning supporting member 40 is positioned in the center portion of the first casing 10.

Also, in order to maintain a smooth sliding state without the first casing 10 and second casing 20 making contact while in the sliding state, a second casing supporting roller 60 is provided on the face of the second casing 20 side of the first casing 10. The length of the sliding direction of the first casing 10 and second casing 20 are the same dimension as the first casing 10 and second casing 20. Therefore, the sliding direction dimension in the case of overlapping becomes highly compact.

The face whereupon operating buttons or the like are primarily mounted on the first casing 10 is an operating face 15, and the face which exposes the output screen on the second casing 20 is the output face 25.

Figure 1G:
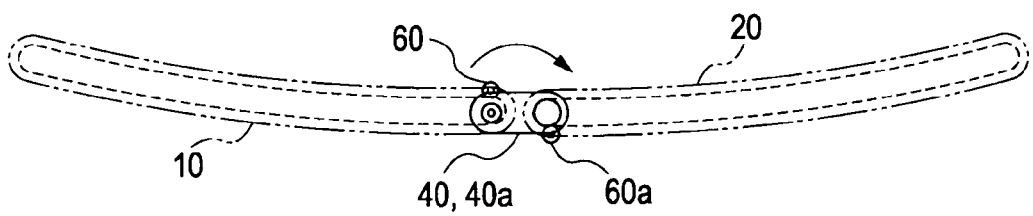
Figure 2:
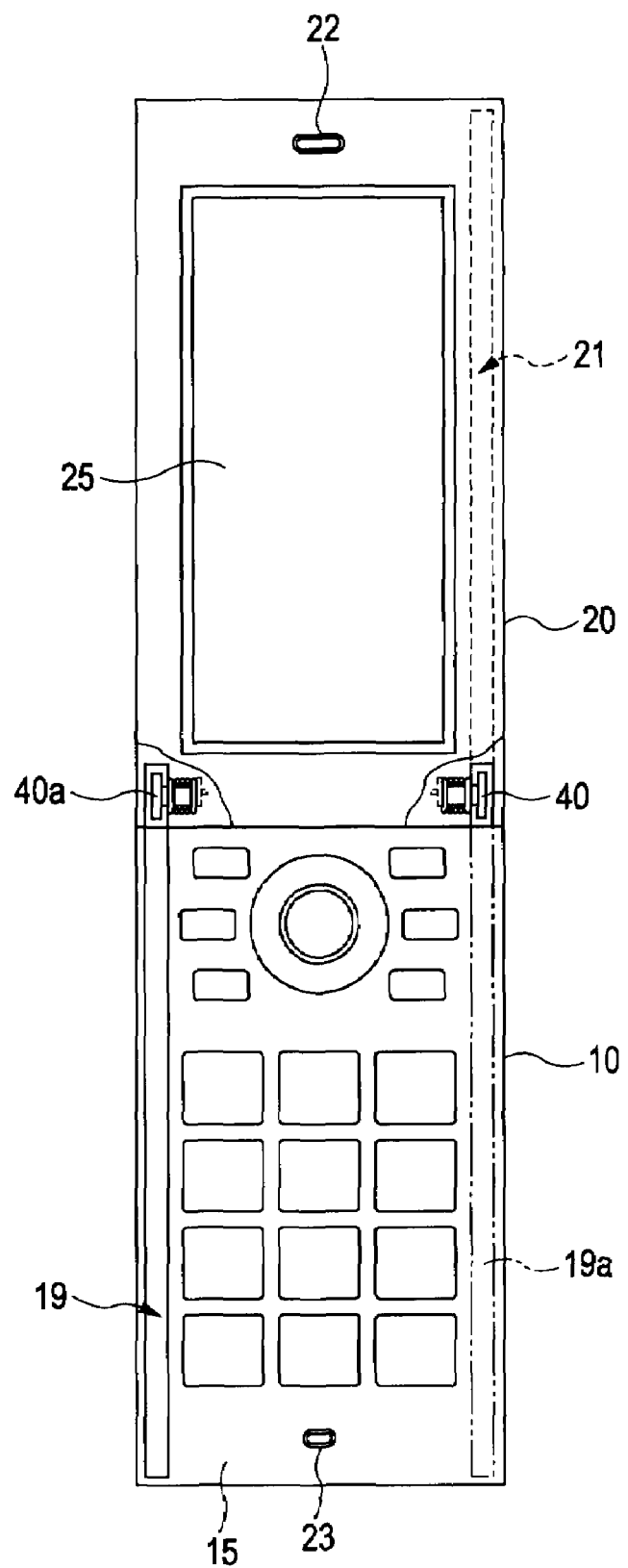
FIG. 2 is a plan view illustrating the portable information terminal according to the first embodiment of the present invention.

In the portable state (before sliding), the entire operating face 15 on the first casing 10 is hidden (FIG. 1A), but in the usable state (after sliding), the entire operating face 15 on the first casing 10 is exposed (FIG. 1G). A feature of the present invention is that a large operating face 15 can be secured as compared to the related art.

(Plan view Configuration of Portable Telephone Terminal)

FIGS. 2 through 4C illustrate a portable telephone terminal according to the first embodiment.

The first casing 10 has a numeric keypad operating face 15, and the second casing 20 has operating keys such as a liquid crystal output face 15, speaker 22, microphone 23, and arrow keys 24. The sizes of the first casing 10 and second casing 20 in the planar direction are rectangles of roughly the same size. The lengthwise direction of the rectangles is the sliding direction.

The operating face 15 of the first casing 10 has a sliding groove 19 along both edges on the lengthwise side, as shown in FIG. 3C. The sliding groove 19 is fixed so that the sliding supporting member 40 which forms an oval-shaped plate is slidable. The second casing 20 is fixed so as to be capable of turning on the opposite side of the sliding groove 19 with the sliding supporting member 40.

Also, a second casing supporting roller 60 for smoothly sliding while in contact with the second casing 20 is axially supported on the inner side of the sliding groove 19 on the second casing 20 side of the operating face 15.

Figure 3:
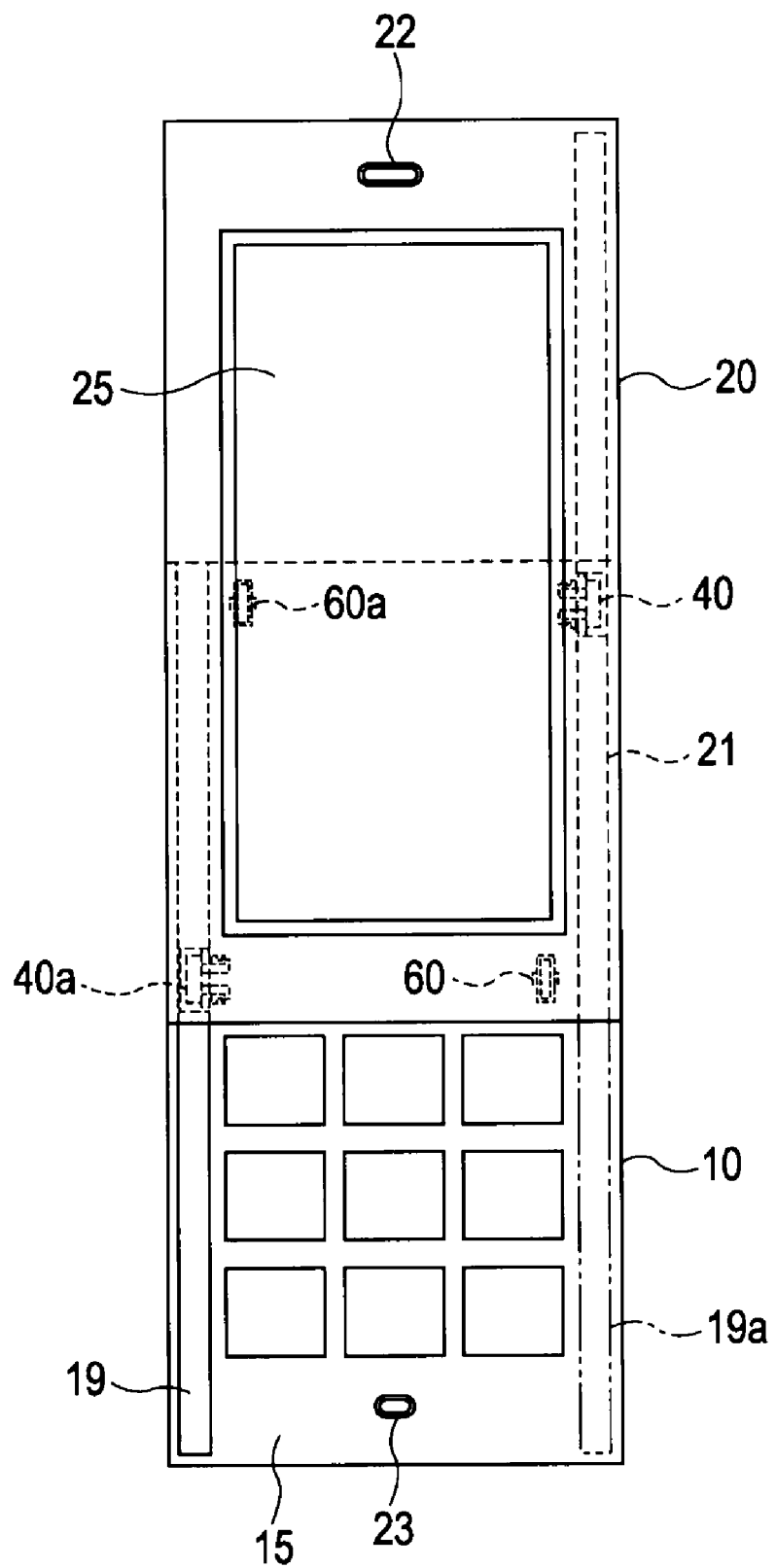
FIG. 3 is a plan view illustrating sliding of the portable information terminal according to the first embodiment of the present invention.

Note that since the design is symmetrical left and right of the functional sliding groove 19 (left side in the diagram), a decorative groove 19a is also provided on the right side in FIG. 3.

Figure 4A:
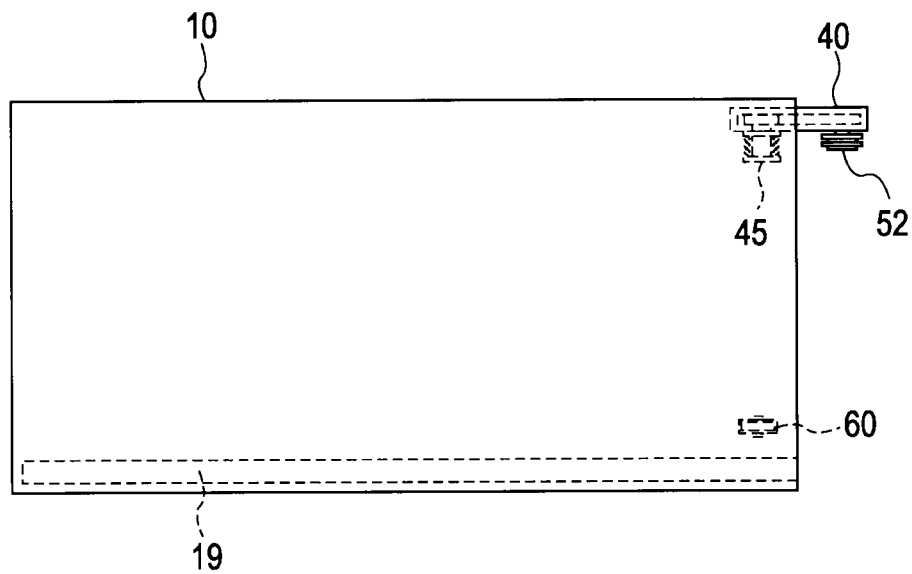
FIGS. 4A through 4C are three views illustrating a first casing of the portable information terminal according to a first embodiment of the present invention.
Figure 4B:
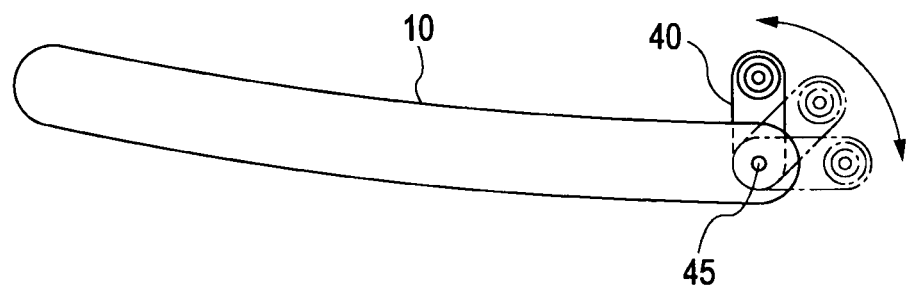
Figure 4C:
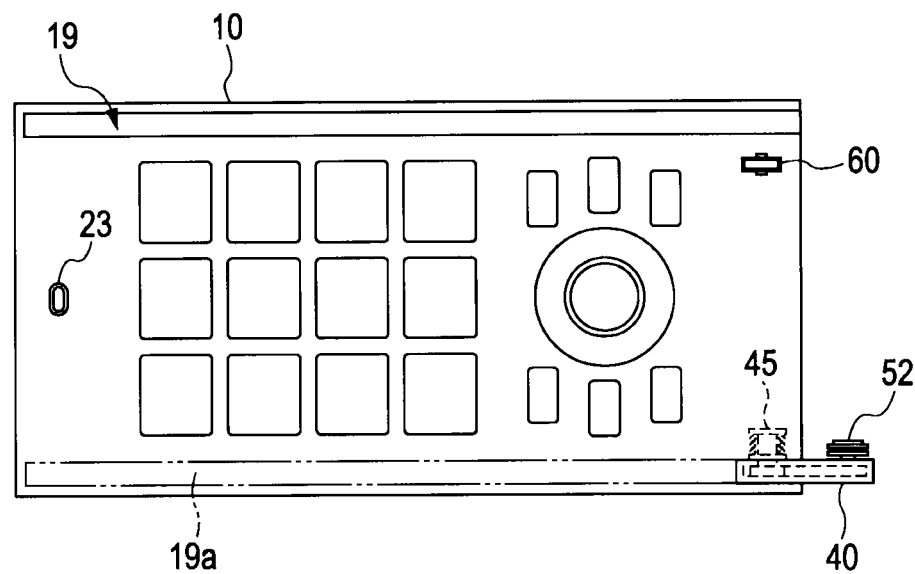

On the face on the opposite side from the display face 25 on the second casing 20, a backside sliding groove 21 is provided along the sliding direction in the lengthwise direction (the right side in FIG. 3), as shown in FIG. 4C. The backside sliding groove 21 is fixed so that the sliding supporting member 40a which forms an oval-shaped plate is slidable. The sliding supporting member 40a has the same configuration as the sliding supporting member 40, and the first casing 10 is fixed on the opposite side from the backside sliding groove 21 so as to be capable of turning.

A first casing supporting roller 60a for smoothly sliding while in contact with the operating face 15 of the first casing 10 is axially supported on the opposite side from the backside sliding groove 21 on the first casing 10 side of the second casing 20.

Note that the backside sliding groove 21 is provided on a face not easily seen by users, which is different from the first casing 10, so this does not have the decorative groove 19a.

(Sliding Mechanism)

With such a configuration, the second casing 20 can slide along the sliding groove 19 as to the first casing 10 via the sliding supporting member 40. Simultaneously, the second casing 20 can slide along the backside sliding groove 21 via the sliding supporting member 40a. That is to say, the first casing 10 and second casing 20 slide in the sliding groove 19 and backside sliding groove 21 while being supported by four points forming a quadrangle with the sliding supporting members 40 and 40a and the first casing supporting rollers 60 and 60a. Accordingly, smooth sliding can be realized.

Figure 5A:
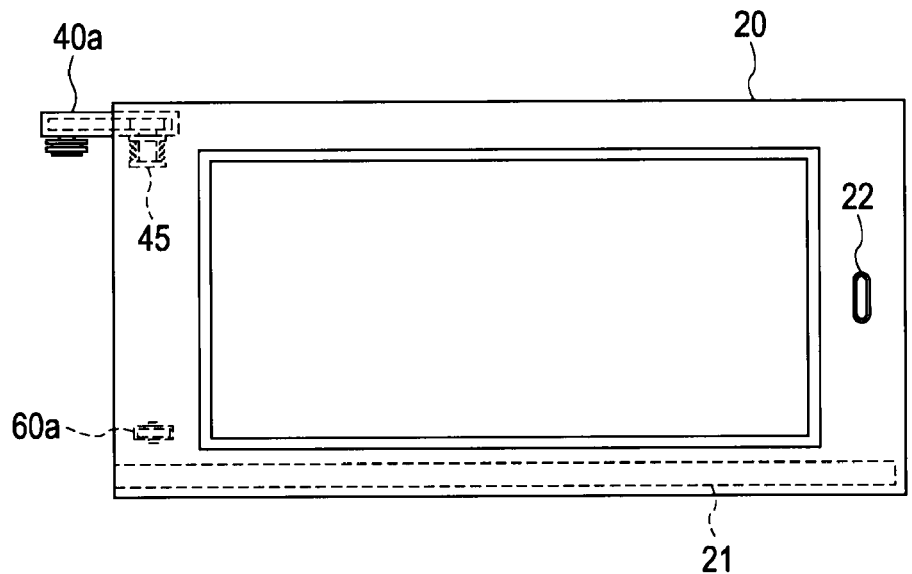
FIGS. 5A through 5C are three views illustrating a second casing of the portable information terminal according to a first embodiment of the present invention.
Figure 5B:
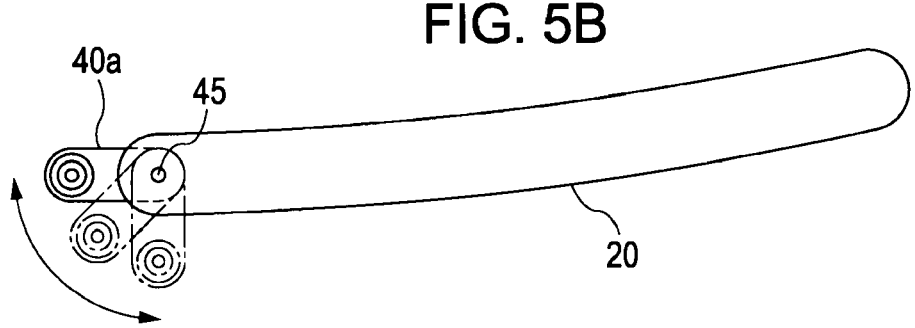
Figure 5C:
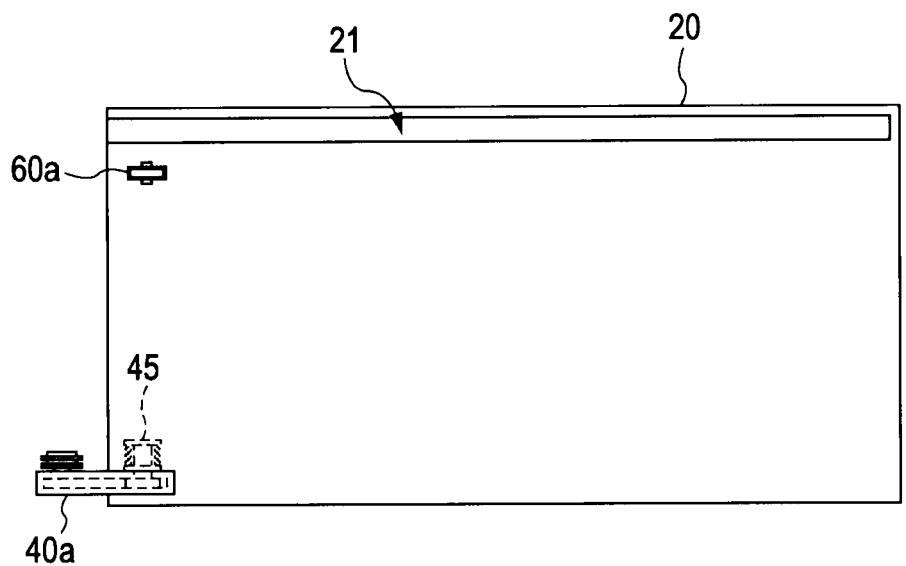

FIGS. 5A through 5C illustrate the sliding state of the portable telephone terminal according to the first embodiment. As shown in these diagrams, a four-point support with the sliding supporting members 40 and 40a and the first casing supporting rollers 60 and 60a is formed, while modifying the state from portable state to usable state, and from usable state to portable state.

In the case that the use externally applies force to slide, even if the direction of such external force is not completely the same as the sliding direction, there is the four-point support so a stabilized sliding state can be maintained.

(From Sliding to Turning)

Figure 6:
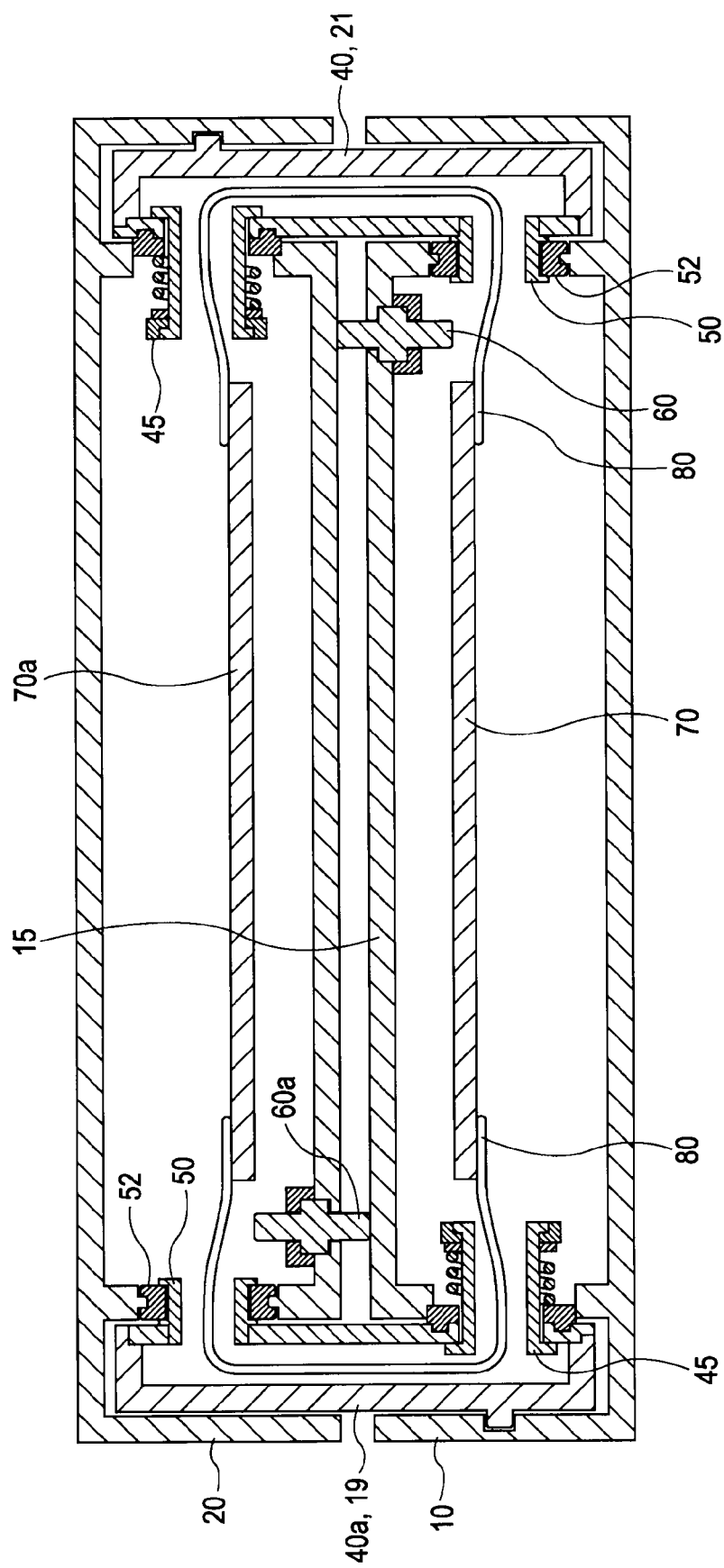
FIG. 6 is a partial expanded view of primary portion of a slide supporting member.

FIG. 6 illustrates the sliding supporting member 40 in the event of ending the sliding state and changing to the usable state with the first casing 10 and second casing 20.

At the cross-section position shown in FIG. 6, the first casing 10 has a sliding groove 19 and the second casing 20 has a sliding groove 21, and the sliding supporting member 40a is positioned in the sliding groove 19 and the sliding supporting member 40 is positioned in the backside sliding groove 21.

A board 70 is built into the first casing 10 and a board 70a is built into the second case 20, and the boards 70 and 70a are electrically connected to cables 80. These cables 80 are optical cables with a diameter of roughly 2 millimeters. One of these cables is sufficient in the case of connecting only one.

(Sliding Supporting Member 40a)

The sliding supporting members 40 and 40a are configured in the same part, and each are positioned alternately on the first casing 10 and second casing 20, the sliding supporting member 40a shown in FIG. 7 will be described. Hereafter, FIG. 7 which shows an expanded view near the sliding supporting member 40, and FIGS. 8A and 8B serving as a configuration perspective view will be described together. Note that FIGS. 8A and 8B are shown for the parts showing in the configuration perspective view, and is in a state of neither a sliding state nor turning state.

Figure 7:
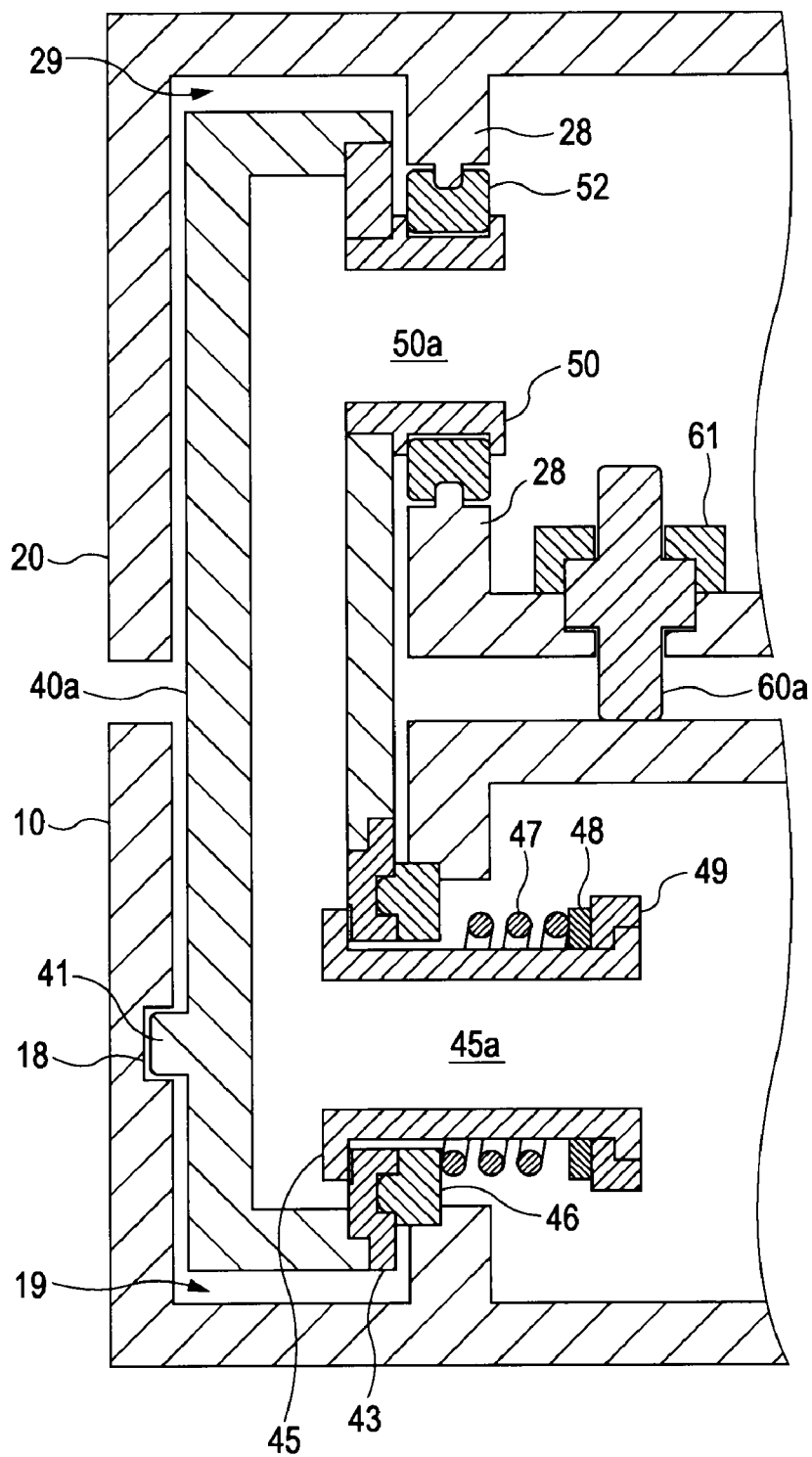
FIG. 7 is a partial expanded view of the primary portions illustrated in FIG. 6.
Figure 8A:
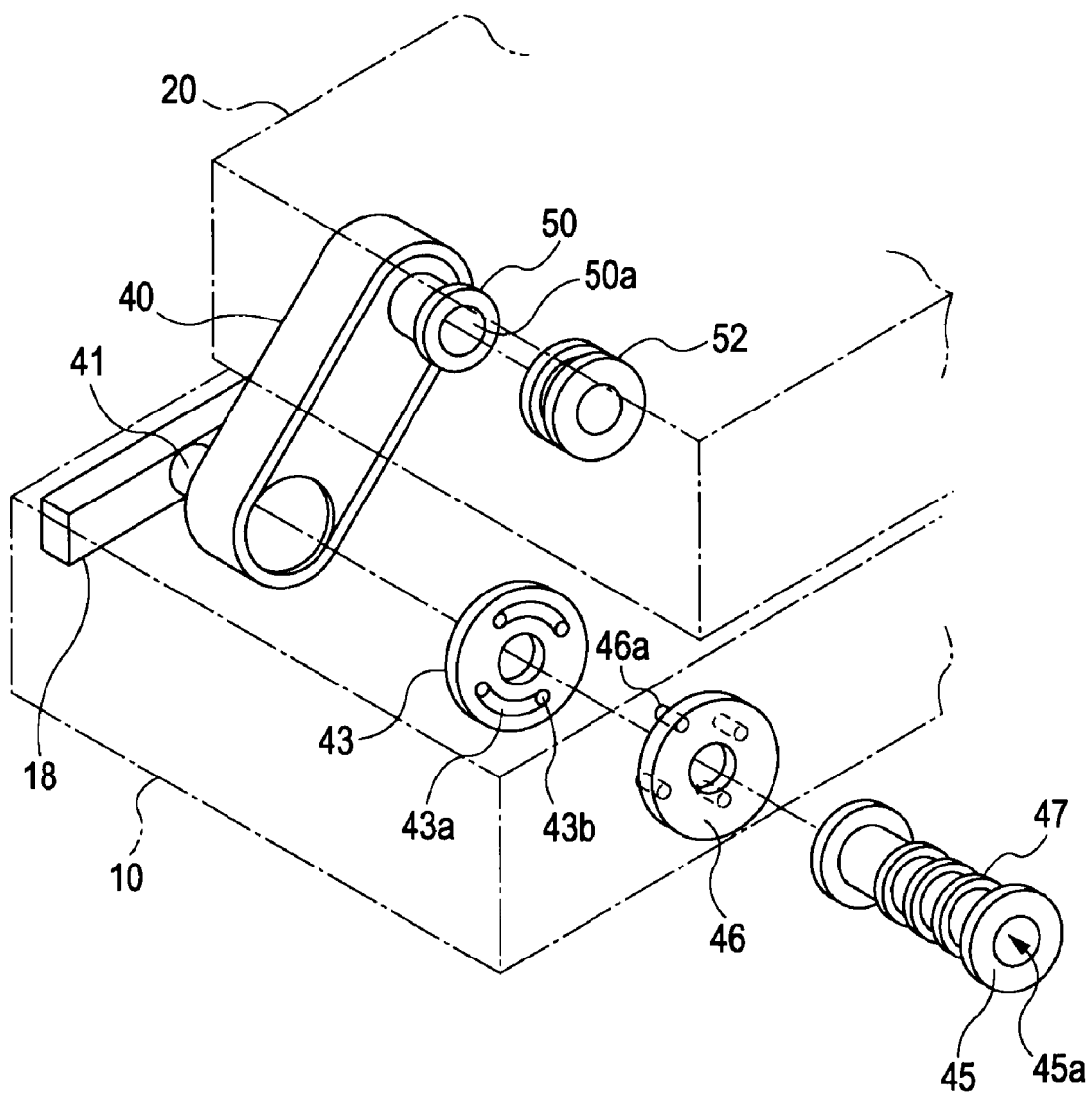
FIGS. 8A and 8B are configuration perspective views of the primary portions illustrated in FIG. 6.
Figure 8B:
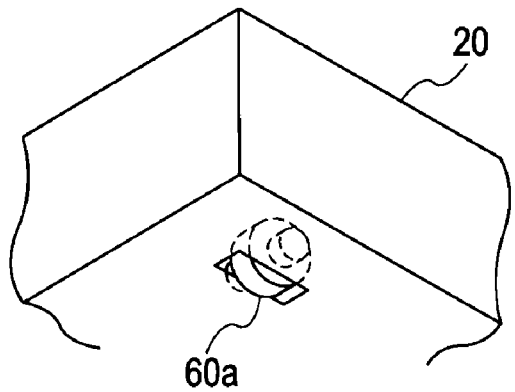

The sliding supporting member 40a has an oval-shaped cross-section in the direction vertical to the sheet in FIG. 6, the cross-section shape showing in FIG. 6 forms a rectangular space, and a turning shaft supporting protruding member 41 is provided near the bottom of the sheet in FIG. 7. A sliding supporting member recessed portion 18 is provided on the first casing 10 to support the turning shaft supporting protruding member 41. The sliding supporting member 40a is a casing with a hollow inner portion thereof, the cable space 45a for storing the cable 80 which connects to the boards 70 and 70a. As described above, the diameter of the cable 80 is roughly two millimeters, so the cable space 45a is greater than this. For example, the diameter is formed to be roughly four millimeters.

Near the lower edge of the sliding supporting member 40a is axially supported as to the first casing 10 by the turning shaft supporting protruding unit 41 and first turning control shaft member 45. The first turning control shaft member 45 has a first supporting disc 43 for fixing to the sliding supporting member 40 and for axially supporting the first turning control shaft member 45, and a first disc suppressing ring 46 to control the turning angle with the first supporting disc 43.

On the other hand, near the upper edge of the sliding supporting member 40 axially supports the second turning control shaft member 50, the second turning control shaft member 50 axially supports a second disc suppressing ring 51, and the second disc suppressing ring 51 axially supports a donut pulley 52. The donut pulley 52 has a flange shape, and is fitted into a pulley supporting unit 28 in a protruding shape provided on the second casing 20. Thus, the sliding supporting member 40 can slide along the second casing 20.

(Turning Control Mechanism)

With the present embodiment, a turning control mechanism for achieving a turning state as shown in FIG. 1 is provided. This turning control mechanism is a mechanism to prevent turning farther than a state wherein the operating face 15 of the first casing 10 and the output face of the second casing 20 forms one face. This turning control mechanism is made with a first turning control shaft member 45 and second turning control shaft member 50.

As shown in FIGS. 8A and 8B, the first supporting disc 43 for supporting the first turning control shaft member 45 has a donut-shaped disc having a hole through which the first control shaft member 45 is inserted for support. Also, the face on the opposite side from the sliding supporting member 40 has two quarter-arc grooves 43a which are grooves along a quarter of the arc. The edge portions of each of the quarter arc grooves 43a become a hemispheric hole 43b which is a hole in the shape of a hemisphere somewhat deeper than the thickness of the groove.

Figure 9A:
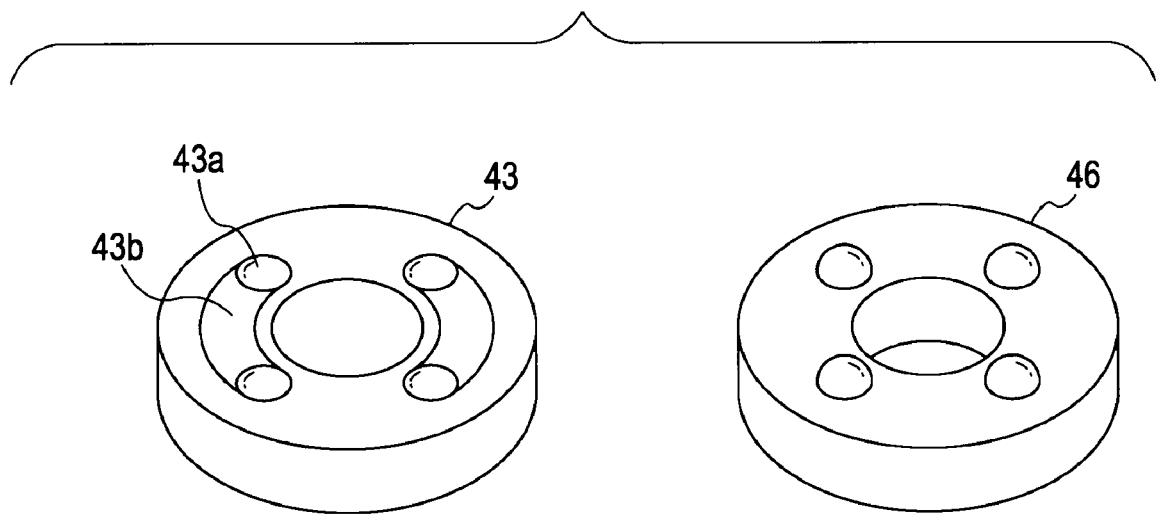
FIGS. 9A and 9B are a perspective view and a plan view of the primary portions.
Figure 9B:
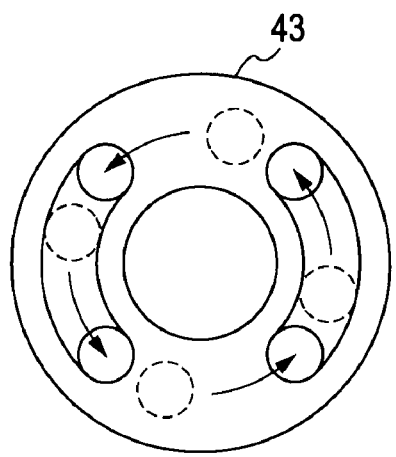

The first disc suppressing ring 46 inserted into the first turning control shaft member 45 engages with such a first supporting disc 43. That is to say, as shown in FIG. 9, the first disc suppressing ring 46 configured as a donut-shaped disc has a hemisphere protruding portion 46a which fits into a hemisphere hole 43b. As shown in FIG. 7, the first disc suppressing ring 46 is attached in the direction of the first supporting disc 43 with a coil spring 47 wrapped onto a flange portion of the first turning control shaft member 45, a washer 48, and a spring suppressing ring 49.

The turning starting position and turning ending position has the hemisphere protruding portion 46a of the first disc suppressing ring 46 fitted into the hemisphere hole 43b of the first disc suppressing ring 46 and is controlled so that no further turning occurs. In the event that the hemisphere protruding portion 46a detaches from the hemisphere hole 43b and approaches the hemisphere hole 43b on the opposite side, the hemisphere protruding portion 46a surmounts a non-continuous state to the quarter-arc grooves 43a, so a clicking sensation occurs.

(Portable Information Terminal)

FIG. 10 shows a plan view in the case that the present invention is applied to a portable information terminal such as a portable gaming device or PDA (portable data assistant) rather than a portable telephone terminal.

Figure 10A:
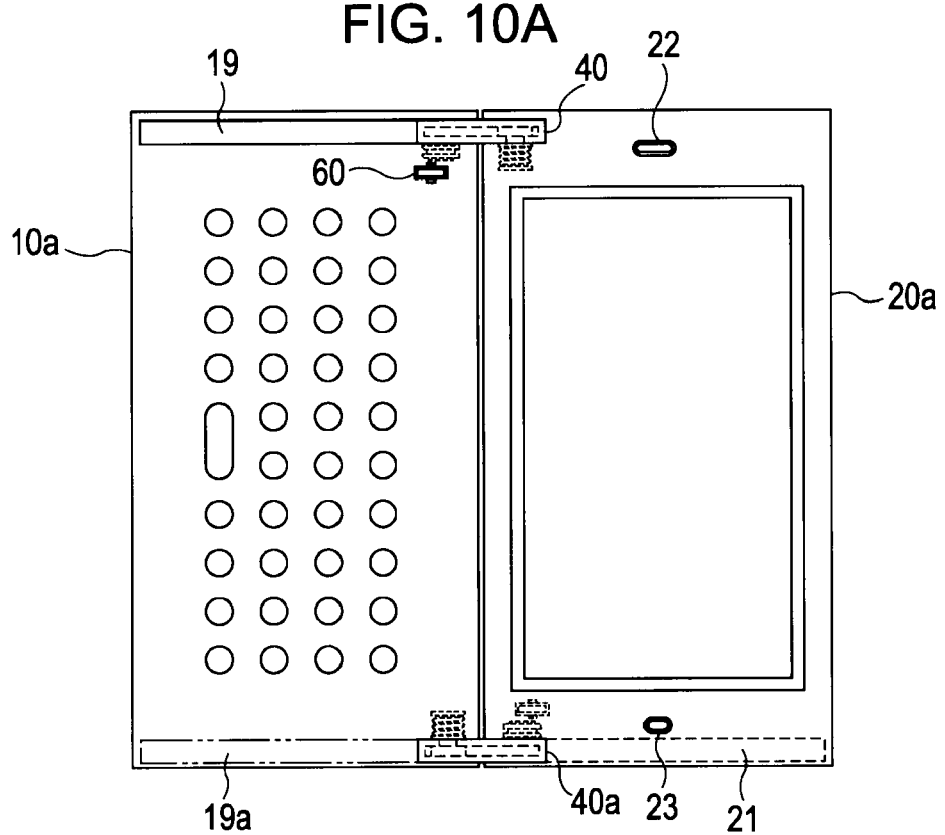
FIGS. 10A and 10B are plan views illustrating portable information terminals according to second and third embodiments of the present invention.

FIG. 10A illustrates a second embodiment. That is to say, the portable information terminal employs a keyboard casing 10a having a full keyboard for the first casing on the operating face, and employs a display screen casing 20a with an almost full-face output screen for the second casing. This is an embodiment primarily readily usable for a PDA, but can be used for a portable telephone terminal also, by creatively employing a portion of the output screen as a patch panel or employing operating buttons on the side face of the casing.

Figure 10B:
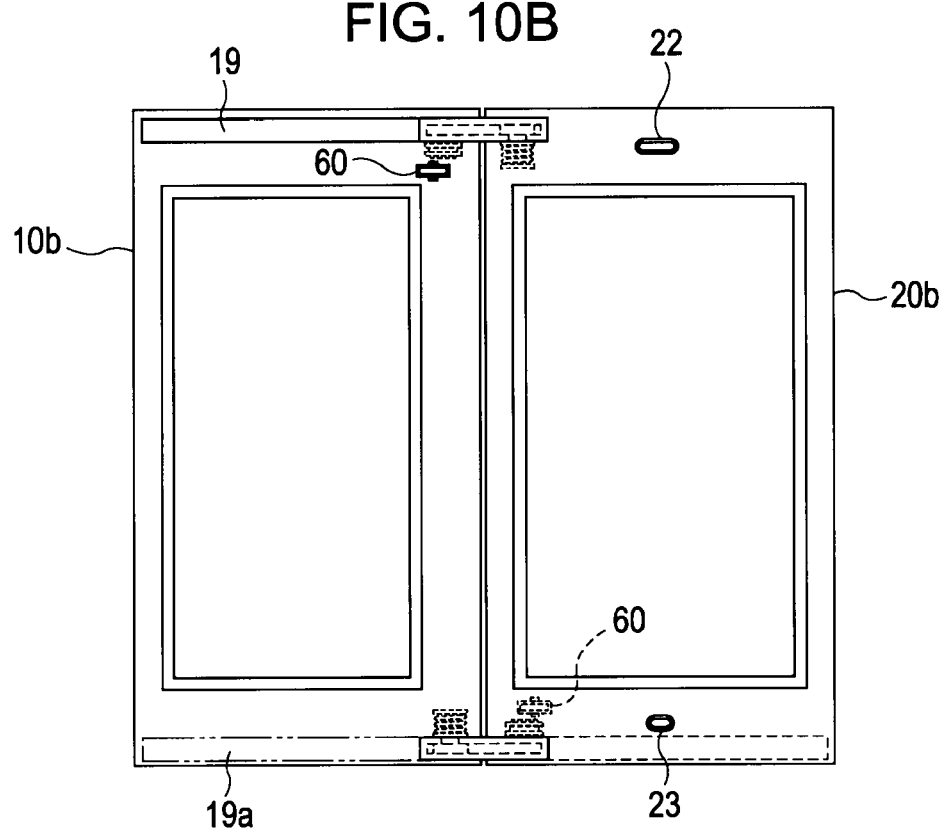

FIG. 10B illustrates a third embodiment. That is to say, both the first casing and second casing have a liquid crystal display screen, wherein the first casing is a touch panel casing 10b of a patch panel type combined with an input device as necessary, and the second casing also is a touch panel casing 20b of a patch panel type combined with an input device as necessary. This is an embodiment primarily readily usable for gaming device, but can be used for a portable telephone terminal or PDA also, by creatively employing a portion of the output screen as a patch panel or employing operating buttons on the side face of the casing.

(Casing Dimension Variation)

Figure 11A:
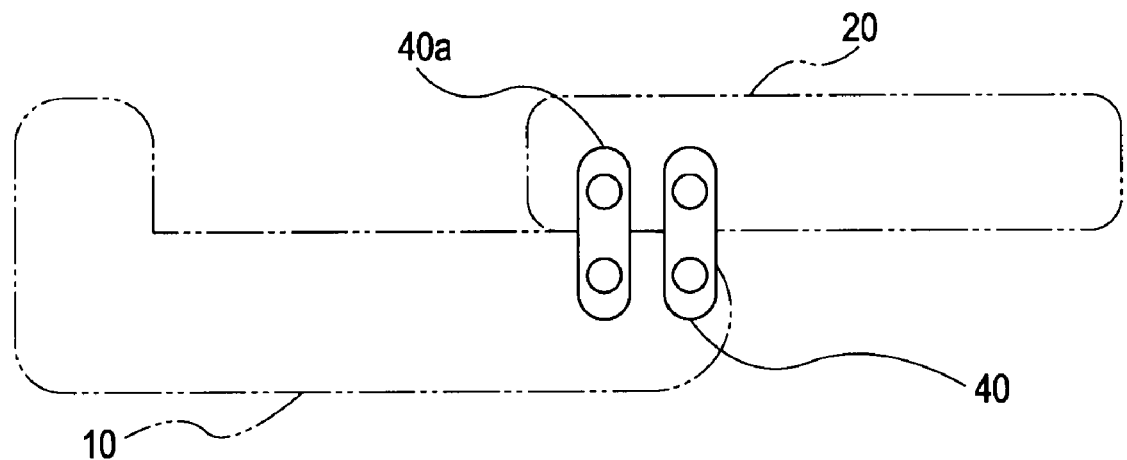
FIGS. 11A and 11B are cross-sectional diagrams illustrating a portable information terminal according to a fifth embodiment of the present invention.
Figure 11A:
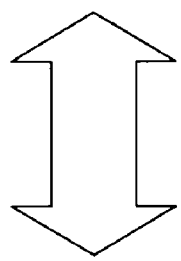
Figure 11B:
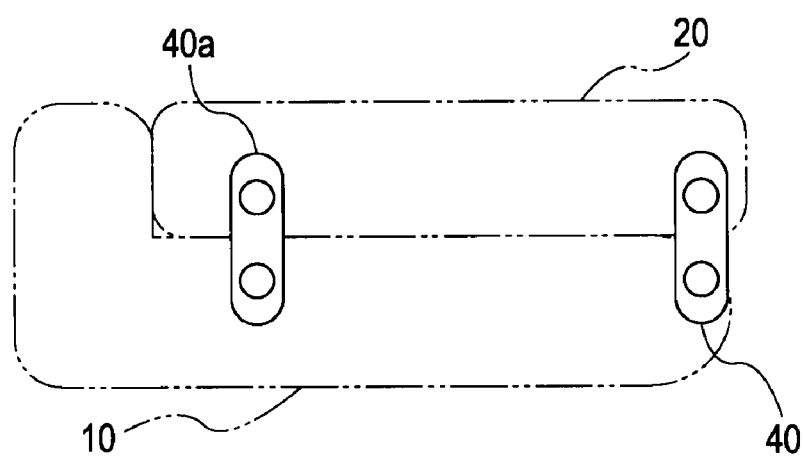

FIG. 11 illustrates a fifth embodiment. The different point from the embodiments described up to this point is the point that the dimensions in the sliding direction between the first casing 10 and second casing 20 and the dimensions in the thickness direction differ.

With the embodiment shown in FIG. 11, the dimensions in the sliding direction of the first casing 10 are smaller than those of the second casing 20, and the thickness of the first casing 10 is formed thinner than the second casing 20.

Note that while not shown, the dimensions in the vertical direction of the sheet may differ between the first casing 10 and second casing 20.

(Turning Control Mechanism Variation)

Figure 12A:
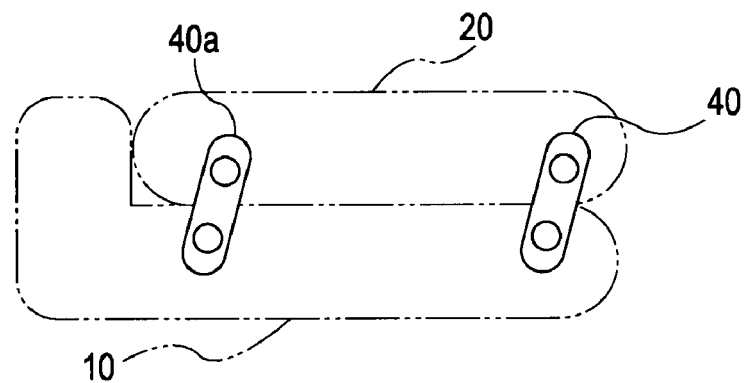
FIGS. 12A through 12C are cross-sectional diagrams illustrating a portable information terminal according to a sixth embodiment of the present invention.
Figure 12B:
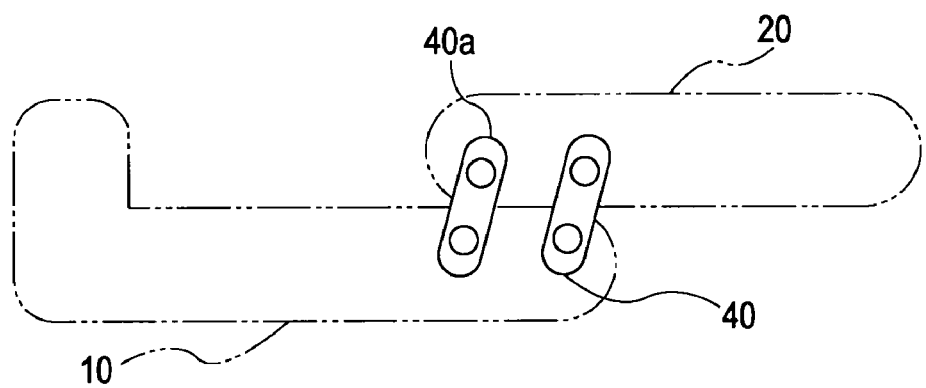
Figure 12C:
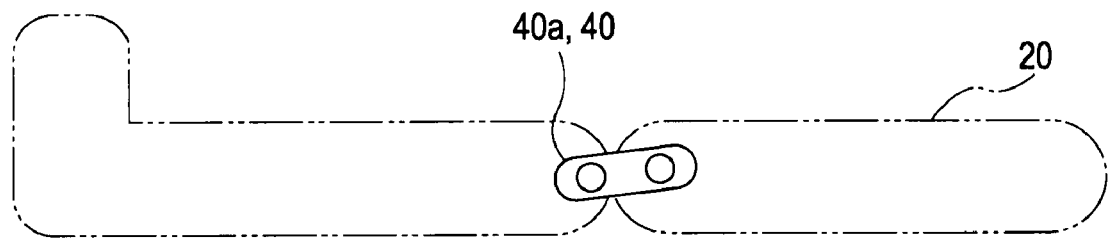

FIG. 12 illustrates a sixth embodiment. With the embodiments described up to this point, when in a portable state and in a sliding state, the angle forming between the lengthwise direction of the sliding supporting member 30 and sliding supporting member 40, and the lengthwise direction of the first casing 10 and second casing 20 has been described as being 90 degrees. Also, when in a usable state, the angle forming between the lengthwise direction of the sliding supporting member 30 and sliding supporting member 40 and the lengthwise direction of the first casing 10 and second casing 20 has been 0 degrees (parallel).

However, as shown in FIG. 12, the angle forming between the lengthwise direction of the sliding supporting member 30 and sliding supporting member 40 and the lengthwise direction of the first casing 10 and second casing 20 is not particularly restricted to 90 degrees or 0 degrees. The turning control mechanism only needs to function in order for the first casing 10 and second casing 20 to maintain the portable state and sliding state, or in order to prevent turning more than necessary when in the usable state.

Note that the descriptions of embodiments described above are only an example of the present invention. The present invention is not limited to the various embodiments described above, and it goes without saying that various modifications may be made according to design and so forth, insofar as they are within the technical spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A sliding-type portable information terminal comprising:
   a flat first casing;
   a flat second casing which is overlapped on said first casing;
   a sliding mechanism to maintain a portable state of said first casing and said second casing overlapped together; and
   a turning mechanism to change from said portable state to a usable state via a sliding state whereby said first casing and said second casing mutually slide;
   said sliding mechanism formed with
      a first sliding mechanism having
         a sliding groove formed in the sliding direction in the first casing;
         a first sliding supporting member formed to slide within the sliding groove without disengaging from the sliding groove; and
         a sliding shaft member to axially support an inverse sliding groove side on the first sliding supporting member with the second casing; and
      a second sliding mechanism having
         a backside sliding groove formed in the sliding direction on the second casing;
         a second sliding supporting member formed to slide within the backside sliding groove without disengaging from the backside sliding groove; and
         a sliding shaft member to axially support the inverse sliding backside groove side on the second sliding supporting member on the first casing;

said turning mechanism having
- a first turning control shaft member to axially support the second casing side on said first sliding supporting member with the first casing; and
- a second turning control shaft member to axially support the first casing side on said second sliding supporting member with the second casing;

wherein the first turning control shaft member and the second turning control shaft member have a turning angle control mechanism wherein turning is stopped at a angle formed by the face on the opposite side of the face of the second casing side of the first casing and the first casing side of the second casing forming a single face when the portable information terminal is in a usable state.

2. The portable information terminal according to claim 1, wherein the turning of said turning control shaft member is stoppable while in the portable state and sliding state, while in the state of the vertical cross-section lengthwise direction of said first casing and the first sliding supporting member are at a predetermined angle; and wherein the turning of said turning control shaft member is stoppable while in the portable state and sliding state, while in the state of the vertical cross-section lengthwise direction of said second casing and the first sliding supporting member are at a predetermined angle.

3. The portable information terminal according to either of claim 1 or claim 2, wherein a decorative groove is provided in the same shape as the sliding groove of said first casing in a linearly symmetrical position as said sliding groove.

4. The portable information terminal according to claim 1, wherein the flat shape of the first casing and second casing are roughly the same shape.

5. The portable information terminal according to claim 1, wherein a space for a cable which is an inner space reaching the first casing and second casing is provided in the turning control shaft member and slide shaft member, with one or both of the first sliding supporting member and second sliding supporting member;

and wherein the space for cable is formed such that a cable or the like to connect a board built into the first casing and a board built into the second casing can be provided therewithin.

* * * * *